United States Patent [19]

Itoh

[11] Patent Number: 4,892,989

[45] Date of Patent: Jan. 9, 1990

[54] DISCHARGE MACHINING APPARATUS HAVING MEANS FOR DISTINGUISHING ABNORMAL INTERELECTRODE GAP CONDITIONS

[75] Inventor: Tetsuroh Itoh, Aichi, Japan

[73] Assignee: Mitsubishi Denki Kabushiki Kaisha, Tokyo, Japan

[21] Appl. No.: 606,328

[22] Filed: May 2, 1984

[30] Foreign Application Priority Data

| May 2, 1983 | [JP] | Japan | 58-77731 |
|---|---|---|---|
| May 4, 1983 | [JP] | Japan | 58-78523 |
| May 4, 1983 | [JP] | Japan | 58-78524 |
| May 4, 1983 | [JP] | Japan | 58-78525 |
| May 4, 1983 | [JP] | Japan | 58-78526 |
| May 4, 1983 | [JP] | Japan | 58-78718 |
| May 4, 1983 | [JP] | Japan | 58-78719 |
| May 4, 1983 | [JP] | Japan | 58-78720 |
| May 4, 1983 | [JP] | Japan | 58-78721 |

[51] Int. Cl.[4] .......................... B23H 1/02; B23H 1/10
[52] U.S. Cl. ............................ 219/69.13; 219/69.14; 219/69.16; 219/69.18
[58] Field of Search ................. 219/69 C, 69 P, 69 G, 219/69.13, 69.16, 69.18, 69.19, 69.14

[56] References Cited

U.S. PATENT DOCUMENTS

| 3,588,428 | 6/1971 | Sennowitz | 219/69 C |
|---|---|---|---|
| 3,627,968 | 12/1971 | Sennowitz | 219/69 C |
| 3,705,286 | 12/1972 | Kondo et al. | 219/69 S |
| 3,812,317 | 5/1974 | De Bont et al. | 219/69 C |
| 3,816,692 | 6/1974 | Ratmansky | 219/69 C |
| 3,825,715 | 7/1974 | Saito et al. | 219/69 P |
| 3,857,011 | 12/1974 | Saito et al. | 219/69 M |
| 3,997,753 | 12/1976 | Inoue | 219/69 M |
| 4,004,123 | 1/1977 | Inoue | 219/69 P |
| 4,249,059 | 2/1981 | Bell, Jr. et al. | 219/69 C |
| 4,375,588 | 3/1983 | Frei | 219/69 P |

FOREIGN PATENT DOCUMENTS

| 2256649 | 6/1973 | Fed. Rep. of Germany | 219/69 C |
|---|---|---|---|
| 2065777 | 10/1975 | Fed. Rep. of Germany | |
| 55-48531 | 4/1980 | Japan | 219/69 C |
| 55-48533 | 4/1980 | Japan | 219/69 C |
| 55-54139 | 4/1980 | Japan | 219/69 C |
| 114622 | 9/1981 | Japan | 219/69 C |
| 152526 | 11/1981 | Japan | 219/69 G |
| 152527 | 11/1981 | Japan | 219/69 G |
| 152536 | 11/1981 | Japan | 219/69 M |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A discharge machining apparatus includes an electrode disposed in confronting relation to a workpiece with an insulative machining solution interposed therebetween for machining the workpiece by an electric discharge generated across an interelectrode gap between the electrode and the workpiece, a detector device for detecting a distribution of times to generate the discharge across the interelectrode gap after a voltage has been applied thereacross, and interelectrode condition discriminator for comparing a distribution of times as detected by the detector means after the voltage has been applied across the interelectrode gap and before the discharge is generated thereacross to produce a signal indicative of a determined condition of the interelectrode gap.

20 Claims, 14 Drawing Sheets

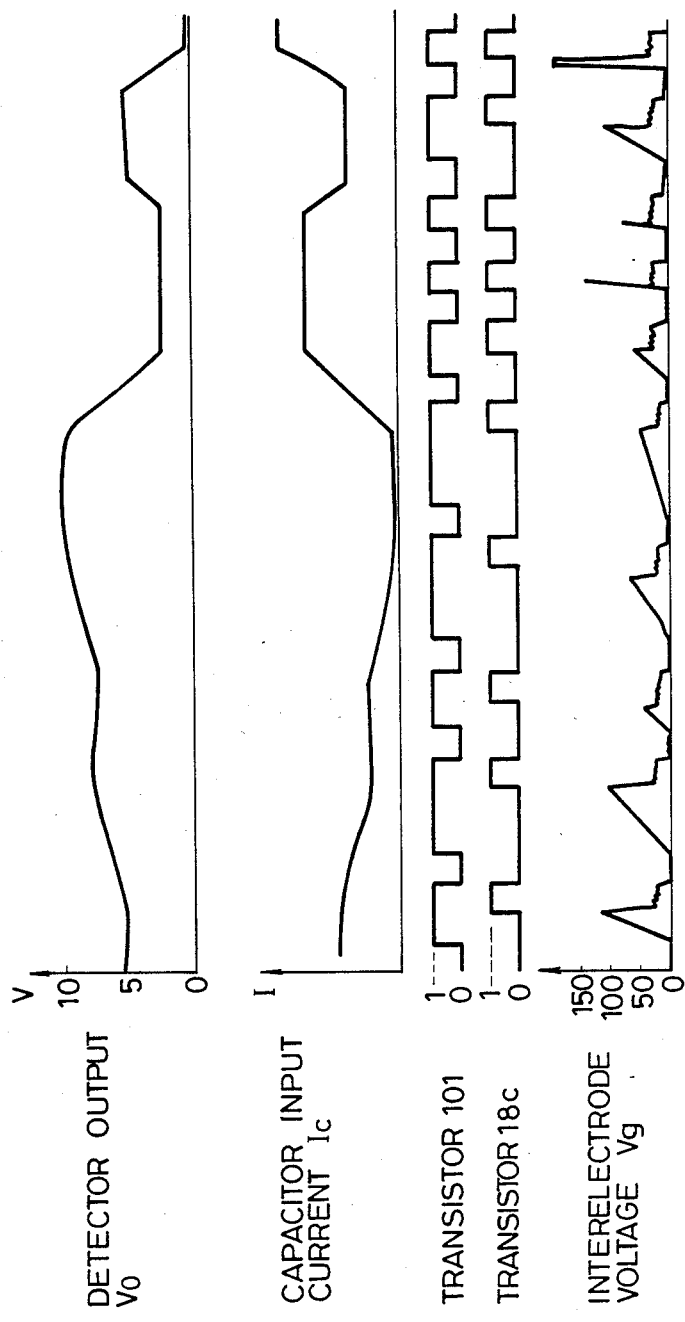

DISCHARGE MACHINING APPARATUS HAVING MEANS FOR DISTINGUISHING ABNORMAL INTERELECTRODE GAP CONDITIONS

BACKGROUND OF THE INVENTION

The present invention relates to a discharge machining apparatus, and more particularly to a discharge machining apparatus in which a first electrode and a workpiece serving as another electrode are disposed in confronting relation with an insulative machining solution interposed therebetween, and an electric discharge is generated between the confronting electrodes for machining the workpiece.

FIG. 1 of the accompanying drawings schematically illustrates a conventional discharge machining apparatus. As shown in FIG. 1, an electrode 10 is disposed in confronting relation to a workpiece 14 placed in a machining bath 12 and serving as another electrode with an insulative machining solution 16 interposed between the electrode 10 and the workpiece 14. A machining power supply unit 18 is connected between the electrode 10 and the workpiece 14. The machining power supply unit 18 includes a DC power supply 18a, a switching element 18b for switching on and off a machining current, a current-limiting resistor 18c, and an oscillator 18d for controlling the switching operation of the switching element 18b. The machining power supply unit 18 thus serves to supply the intermittent machining current across an interelectrode gap 20 between the electrode 10 and the workpiece 14.

The machining current, designated by I, is expressed by $I=(E-V_g)/R$ where E is the voltage value from the DC power supply 18a, R the resistance value of the current-limiting resistor 18c, and $V_g$ the voltage across the interelectrode gap 20. The interelectrode voltage value $V_g$ ranges from 20 to 30 V during an arc discharge, is 0 V on short-circuiting, is E V during no discharge, and is 0 V while the switching element 18b is turned off.

The interelectrode gap 20 can be controlled by detecting the interelectrode voltage value $V_g$ and averaging the detected voltage value with a smoothing circuit 22. More specifically, when the interelectrode gap is wide, an electric discharge is less liable to take place and the average voltage $V_s$ is high. When the interelectrode gap is narrow, it tends to be short-circuited or can easily be subjected to an electric discharge, and hence the average voltage $V_s$ is low. Accordingly, the electrode 10 can be controlled to keep the interelectrode gap 20 substantially constant with a hydraulic servomechanism composed of a hydraulic pump 28 and a hydraulic cylinder 30 by comparing the average voltage value $V_s$ with a reference voltage value $V_r$, amplifying the difference between the voltages with an amplifier 24, and applying the amplified signal to a hydraulic servo valve 26.

In determining whether the workpiece is being properly machined or not in the prior discharge machining apparatus, it has been customary to monitor the average value $V_s$ of the interelectrode voltage $V_g$. When the average voltage $V_s$ is low, the interelectrode impedance is low, resulting in a short circuit or a continuous arc discharge. When this happens, machined chips or sludge accumulate between the electrodes. Also, an abnormal arc discharge can take place between the workpiece and a body of carbon produced due to thermal decomposition of the machining solution, with the result that the interelectrode impedance is increased. Therefore, it has been impossible to detect a poor condition of the interelectrode gap due to an abnormal arc discharge merely by monitoring the average voltage value $V_s$.

SUMMARY OF THE INVENTION

With the prior difficulties in view, it is an object of the present invention to provide a discharge machining apparatus for discriminating a normal discharge from an abnormal discharge by detecting a distribution of times after a voltage is applied across an interelectrode gap and before a discharge is generated across the gap.

Another object of the present invention is to provide a discharge machining apparatus for discriminating a normal discharge from an abnormal discharge by detecting a distribution of times after a voltage is applied across an interelectrode gap and before a discharge is generated across the gap, and for reducing the rate of increase or gradient of the voltage applied by a power supply per unit time to restore the interelectrode gap to a normal condition to reduce the ease with which the discharge takes place, thereby preventing a discharge concentration and the generation of an abnormal arc discharge.

Still another object of the present invention is to provide a discharge machining apparatus for discriminating a normal discharge from an abnormal discharge by detecting a distribution of times after a voltage is applied across an interelectrode gap and before a discharge is generated across the gap, and for reducing the voltage applied by a power supply to reduce the ease with which the discharge takes place so as to restore the interelectrode gap to a normal condition, thereby preventing a discharge concentration and the generation of an abnormal arc discharge.

Still another object of the present invention is to provide a discharge machining apparatus for discriminating a normal discharge from an abnormal discharge by detecting a distribution of times after a voltage is applied across an interelectrode gap and before a discharge is generated across the gap, and for increasing an OFF time of a switching element to ensure the provision of an adequate time period for deionizing the interelectrode gap so as to restore the interelectrode gap to a normal condition, thereby preventing a discharge concentration and the generation of an abnormal arc discharge.

Still another object of the present invention is to provide a discharge machining apparatus for discriminating a normal discharge from an abnormal discharge by detecting a distribution of times after a voltage is applied across an interelectrode gap and before a discharge is generated across the gap, and for varying a reference voltage for controlling the interelectrode gap so as to restore the interelectrode gap to a normal condition, thereby preventing a discharge concentration and the generation of an abnormal arc discharge.

Still another object of the present invention is to provide a discharge machining apparatus for discriminating a normal discharge from an abnormal discharge by detecting a distribution of times after a voltage is applied across an interelectrode gap and before a discharge is generated across the gap, and for injecting a machining solution into the interelectrode gap in an appropriate amount to ensure an optimum quantity of the machining solution in the gap so as to restore the interelectrode gap to a normal condition, thereby preventing a discharge concentration and the generation of an abnormal arc discharge.

A still further object of the present invention is to provide a discharge machining apparatus for discriminating a normal discharge from an abnormal discharge by detecting a distribution of times after a voltage is applied across an interelectrode gap and before a discharge is generated across the gap, and for controlling the pressure of a machining solution supplied to the interelectrode gap to forcibly remove sludge and machined chips deposited in the gap so as to restore the interelectrode gap to a normal condition, thereby preventing a discharge concentration and the generation of an abnormal arc discharge.

A still further object of the present invention is to provide a discharge machining apparatus for discriminating a normal discharge from an abnormal discharge by detecting a distribution of times after a voltage is applied across an interelectrode gap and before a discharge is generated across the gap, and for controlling the sensitivity of servo means in order to widen and narrow the interelectrode gap at a high speed to mechanically remove any adverse condition in the gap so as to restore the interelectrode gap to a normal condition, thereby preventing a discharge concentration and the generation of an abnormal arc discharge.

A yet further object of the present invention is to provide a discharge machining apparatus for discriminating a normal discharge from an abnormal discharge by detecting a distribution of times after a voltage is applied across an interelectrode gap and before a discharge is generated across the gap, and for forcibly widening and narrowing the interelectrode gap to generate a solution flow due to a pumping action based on the variation of the interelectrode gap so as to restore the interelectrode gap to a normal condition, thereby preventing a discharge concentration and the generation of an abnormal arc discharge.

To achieve the foregoing objects, a discharge machining apparatus according to the present invention includes a first electrode placed in confronting relation to a workpiece serving as another electrode with an insulative machining solution interposed therebetween for machining the workpiece by an electric discharge generated across an interelectrode gap between the electrode and the workpiece, the discharge machining apparatus comprising detector means for detecting a distribution of times after a voltage has been applied across the interelectrode gap and before the discharge is generated across the interelectrode gap and for comparing a detected signal with representative distributions indicative of good and poor conditions of the interelectrode gap to determine the condition of the interelectrode gap, and means for issuing a signal indicative of a poor condition of the interelectrode gap in response to a signal from the detector means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a timing chart illustrative of operations of the control device shown in FIG. 7;

DESCRIPTION OF THE PREFERRED EMBODIMENTS

Figure 1:
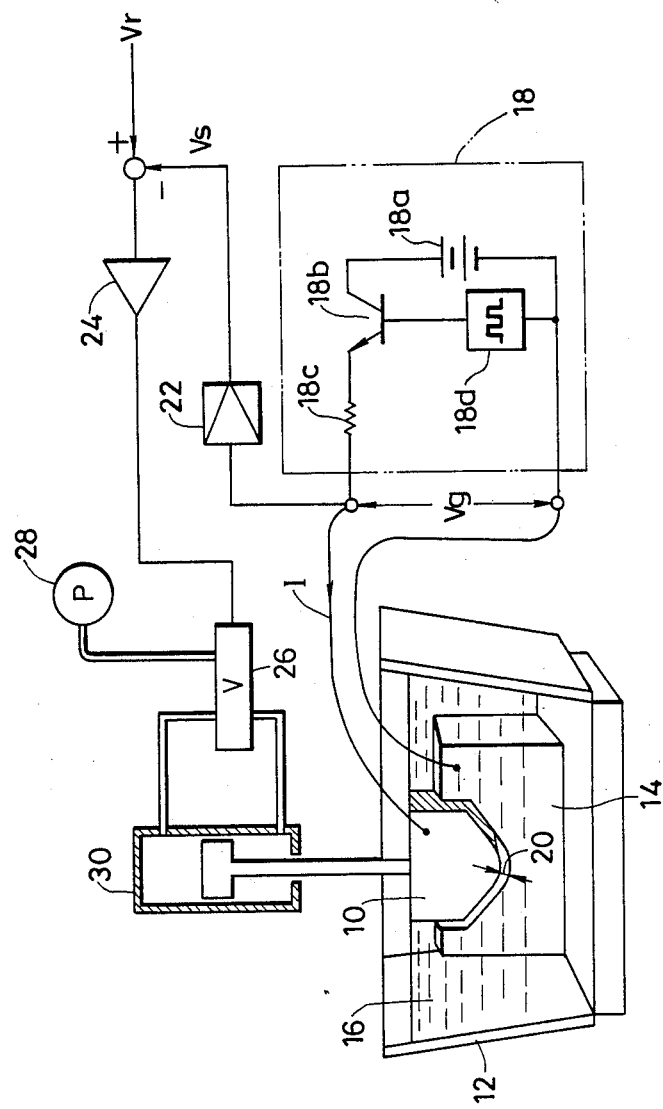
FIG. 1 is a schematic diagram illustrating the principles of a conventional discharge machining apparatus.
Figure 2:
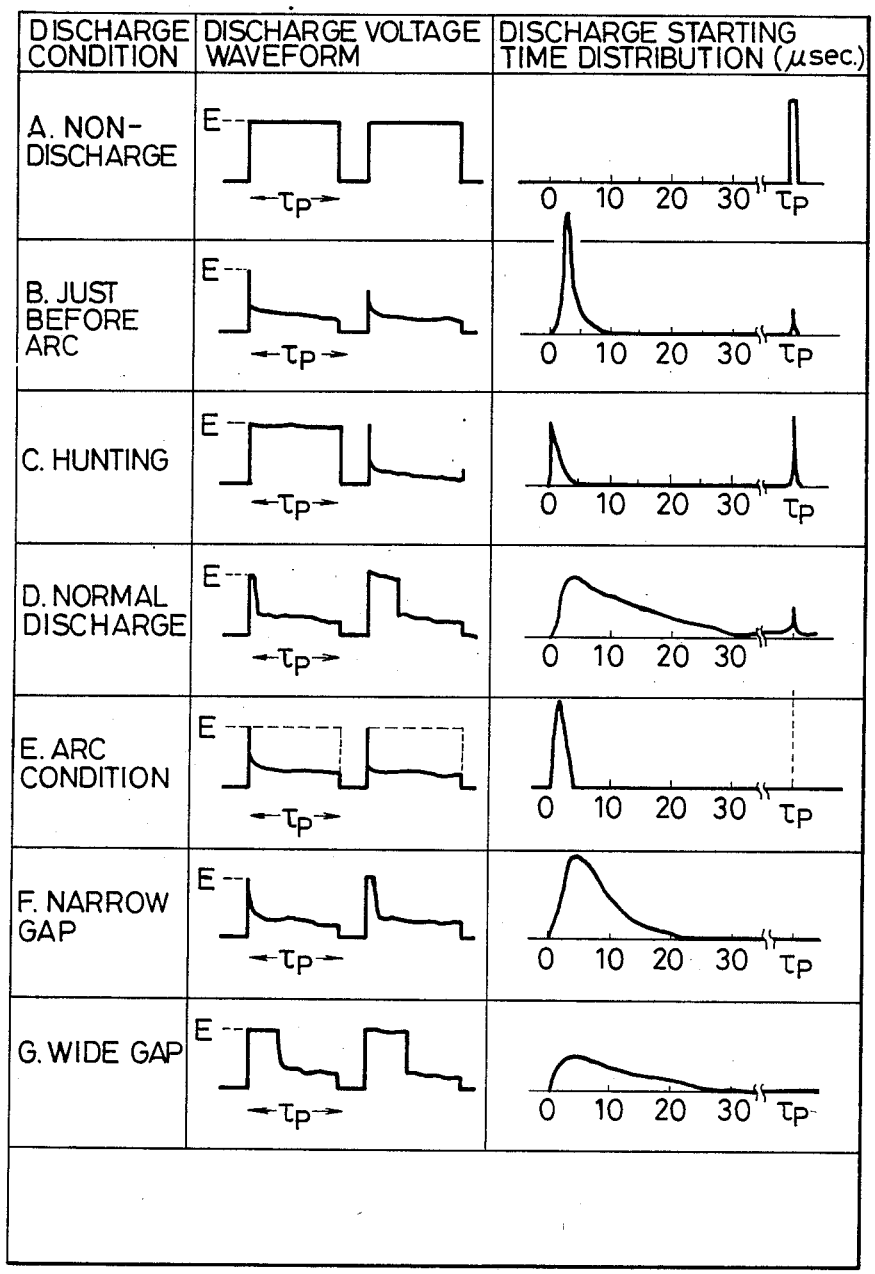
FIG. 2 is a diagram illustrative of the principles of the present invention.

FIG. 2 shows discharge voltage waveforms and distributions of non-discharge times after voltages of such waveforms have been applied and before discharges are started, the waveforms being experimentally obtained and illustrative of the principles of detection according to the present invention. Since the discharge starting points are determined by detecting the times when the voltages fall, signals are also generated when the pulses are shifted from an ON condition to an OFF condition. The relationship between the time distributions and interelectrode conditions has resulted in the following observations:

(A) A discharge is highly likely to start within 5 microseconds after a voltage has been applied except when the interelectrode gap is open, that is, when the electrode and the workpiece are completely spaced from each other and no machining takes place.

(B) The percentage of discharges starting within the above 5 microseconds exceeds 70% in the stepped leader of an arc.

(C) When the servo system has poor stability and hunting occurs, non-discharge and short-circuiting are alternately repeated, and no discharge distribution is present upon elapse of the 5 microseconds.

(D) During a normal discharge, the distribution is about 30% within the 5 microseconds after the voltage has been imposed, and thereafter the distribution is gradually reduced.

(E) Under an arc condition, the distributions (A) and (B) are alternately repeated in the period of a few seconds. This appears to result from the fact that a discharge occurs between bodies of carbon produced by an abnormal arc discharge, and the discharge mode is different from that in which a general electrode and workpiece combination is used in discharge machining.

(F) When the interelectrode gap is extremely narrow, the distribution becomes analogous to that in the stepped leader of the arc referred to in (B) above. However, the distribution is present at 10% or more during a time interval from 5 to 30 microseconds.

(G) When the servo system is actuated to open the interelectrode gap, a discharge takes place within the 5 microseconds at a percentage ranging from 10 to 20%, and the distribution gradually decreases thereafter.

It follows from the above observations that the interelectrode gap can be assumed as being normal when under the following conditions:

(1) A pulse for starting a discharge occurs in the time interval from 5 to 30 microseconds, at a percentage of 10% or more.

(2) The percentage of pulses causing a discharge within 5 microseconds does not exceed 50%.

(3) The percentage at which no discharge takes place even at $\tau_p$ does not exceed 50%.

Figure 3:
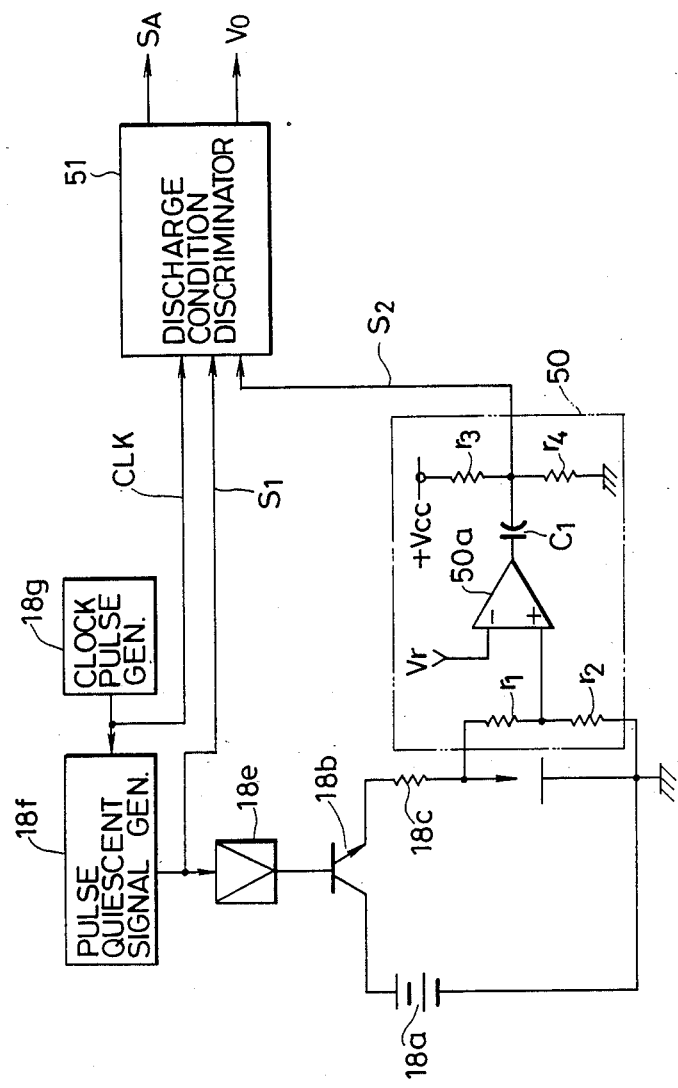
FIG. 3 is a schematic diagram, partly in block form, of a detector circuit according to the present invention.

FIG. 3 is a circuit diagram, partly in block form, of a circuit arrangement including an embodiment of the present invention. In FIG. 3, a switching transistor 18b for applying a voltage across an interelectrode gap to pass a discharge current therethrough is driven by a switching amplifier 18e supplied with a pulse quiescent signal which is generated by a pulse quiescent signal generator 18f. The pulse quiescent signal generator 18f is supplied with clock pulses produced by a clock pulse generator 18g. The clock pulses should have a frequency of 1 MHz or higher since they are also used for sampling a time period before a discharge is caused by the voltage applied across the interelectrode gap. The falling edge of the voltage across the interelectrode gap is detected by a circuit 50 in which a signal that is voltage-divided by resistors $r_1$, $r_2$ is compared by a comparator 50a with a reference voltage $V_r$, and a signal from the comparator 50a when the voltage-divided signal is lower than the reference voltage $V_r$ is processed by a falling-edge differentiator composed of resistors $r_3$, $r_4$ and a capacitor C1, thereby producing a signal $S_2$.

Figure 4:
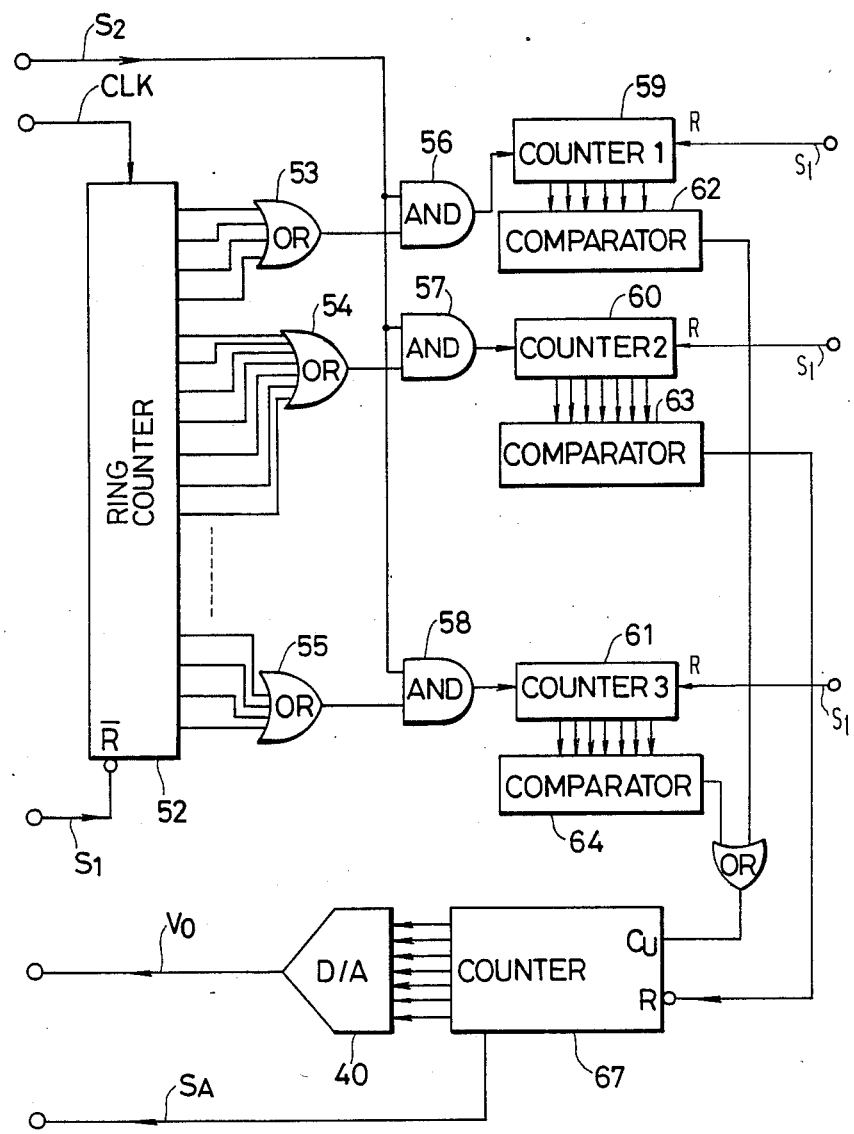
FIG. 4 is a block diagram of a discharge condition discriminator in the detector circuit shown in FIG. 3.
Figure 5:
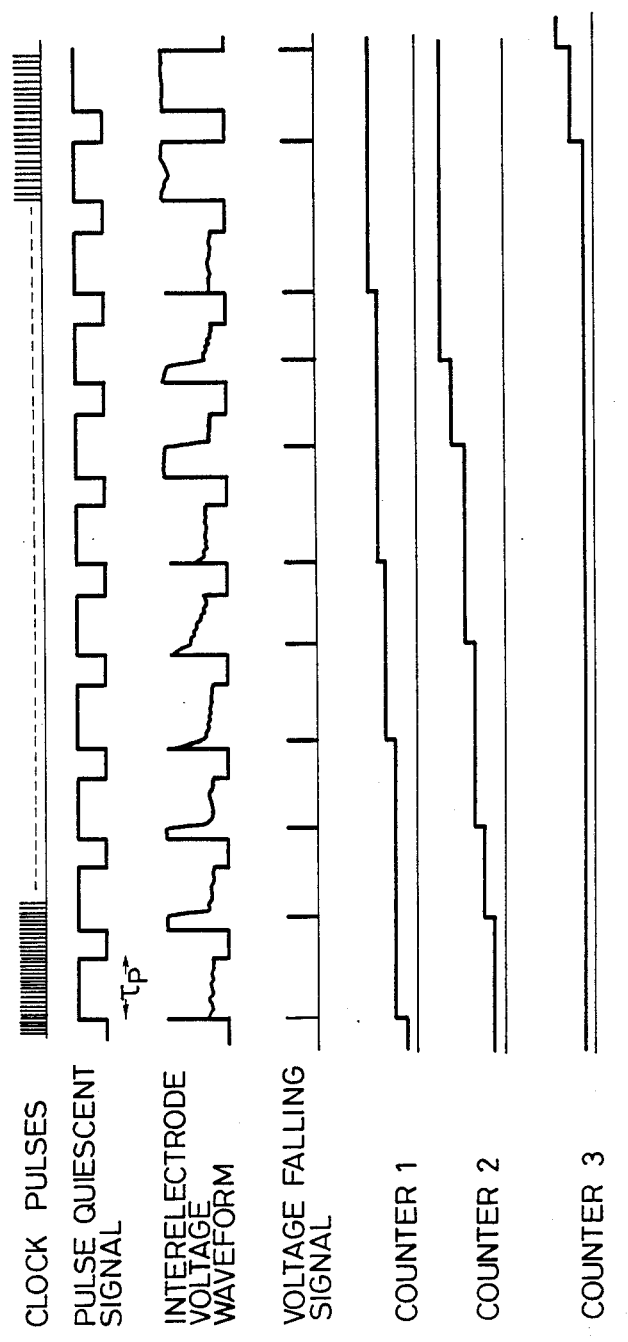
FIG. 5 is a timing chart showing operations of the discharge condition discriminator of FIG. 4.

A discharge condition discriminator 51 will be described with reference to FIGS. 4 and 5. When a voltage is applied across the interelectrode gap, a ring counter 52 is energized to open OR gates 53, 54 and 55 in each time interval. For example, the OR gate 53 produces an output signal of "1" during a time interval from 0 to 5 microseconds. If a voltage falling signal $S_2$ is applied due to a discharge caused during this time, then counters 59, 60 and 61 count pulses dependent on discharge distributions in respective zones in a prescribed period through AND gates 56, 57 and 58. The prescribed period preferably ranges from 10 to 30 milliseconds in view of the rate at which the condition of the interelectrode gap varies and also of experimental results. The contents of the counters 59, 60 and 61 are discriminated by digital comparators 62, 63 and 64 which determine how many pulses, more or less than a certain number, have caused discharges in the prescribed period at what distribution of times of non-load voltage application. The distributions are classified into abnormal and normal distributions, as described above. When any distribution is determined as abnormal, the pulses are further counted by a counter 67.

When any distribution is determined as normal, the counter 67 is reset. Therefore, when any distribution is judged as abnormal, that is, when the percentage of discharges within the 5 microseconds after the voltage has been imposed is 50% or higher, or the percentage of no discharges even when the pulses are stopped is 50% or higher, the counter 67 is incremented. When there are pulses causing discharges in the interval from 5 to 30 microseconds at 10% or more, the counter 67 is immediately reset. As a consequence, the counter 67 is set to zero whenever the distribution is normal, and is incremented whenever the distribution is abnormal. By converting the count from the counter 67 into an analog voltage $V_0$ with an digital-to-analog converter 40 and monitoring the analog voltage $V_0$, the condition of the interelectrode gap can be determined. By way of example, when the analog voltage $V_0$ is high, the condition approaches an abnormal discharge, and various deficiencies can easily be detected such as a deposit of sludge in the interelectrode gap due to machined chips accumulated therein, a mass of carbon produced by thermal decomposition of the machining solution 16 due to an abnormal arc, or broken pieces of the electrode present in the interelectrode gap.

The condition of the interelectrode gap always however varies in a short period of time, and cannot necessarily be judged as poor even if a high analog voltage $V_0$ is detected in such a short period of time. As a consequence, it is necessary to determine the condition of the interelectrode gap by detecting when the output voltage $V_0$ of the digital-to-analog converter 40 remains higher than a predetermined value for a certain period of time.

Figure 6:
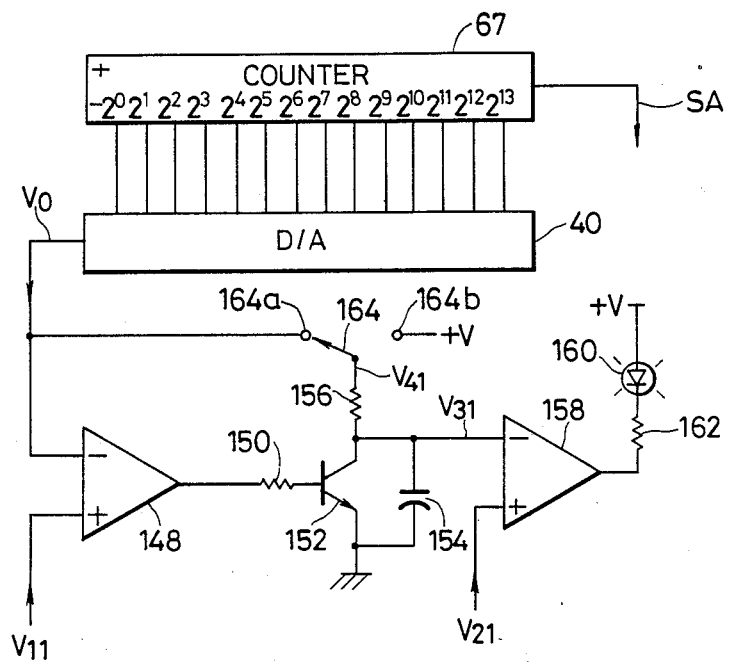
FIG. 6 is a block diagram of an interelectrode gap condition discriminator according to an embodiment of the present invention.

FIG. 6 shows a voltage comparator 148 for determining whether the output voltage $V_0$ from the digital-to-analog converter 40 is higher than a predetermined value $V_{11}$. When $V_0 > V_{11}$, the output from the voltage comparator 148 goes negative, turning off a switching transistor 152 through a base resistor 150. Therefore, a time measuring capacitor 154 is charged through a resistor 156. The voltage $V_{31}$ across the capacitor 154 can be expressed by the following equation:

$$V_{31} = V_{41}(1 - \exp(-t/r_{21}c))$$

where r21 is the resistance value of the resistor 156, c is the capacitance of the capacitor 154, and t is time.

The voltage $V_{31}$ across the capacitor 154 is compared with a reference voltage $V_{21}$ by a voltage comparator 158. During an interval in which $V_{31} < V_{21}$, the output from the voltage comparator 158 does not go negative, and hence a light-emitting diode 160 remains de-energized. When $V_{31} > V_{21}$ as a result of the condition $V_0 > V_{11}$ having continued for the time period, the output from the voltage comparator 158 goes negative, thus energizing the light-emitting diode 160 through a resistor 162 to indicate an abnormal condition of the interelectrode gap.

A switch 164 serves to switch between a mode in which the interelectrode gap condition is determined solely as a function of time and another mode in which the interelectrode gap condition is determined as a function of the product of the magnitude of the output $V_0$ from the digital-to-analog converter 40 and time. More specifically, when a machining process is effected in which it is difficult to determine the condition of the interelectrode gap, e.g., when such a machining process is carried out in which hard metal is momentarily cracked by an arc or a mass of tungsten is broken off by an arc, the switch 164 is shifted to a contact 164a as illustrated to determine any abnormal condition of the interelectrode gap as a function of the output $V_0$ from the digital-to-analog converter 40 and time. This is because if the output voltage $V_0$ is high, the charging current through the capacitor 154 is increased, and the voltage $V_{31}$ across the capacitor 154 immediately reaches the reference voltage $V_{21}$.

If the output voltage $V_0$ is monitored directly by a voltmeter, the voltmeter can be used as a monitor for the condition of the interelectrode gap.

While in the foregoing embodiment the distributions of discharge starting times are measured by the counters, they may be combined with a processor capable of arithmetic operations so that the distributions can be displayed on a cathode-ray tube. Such an alternative can display how the present distribution differs from a normal distribution and which mode the discharge is in.

Figure 7:
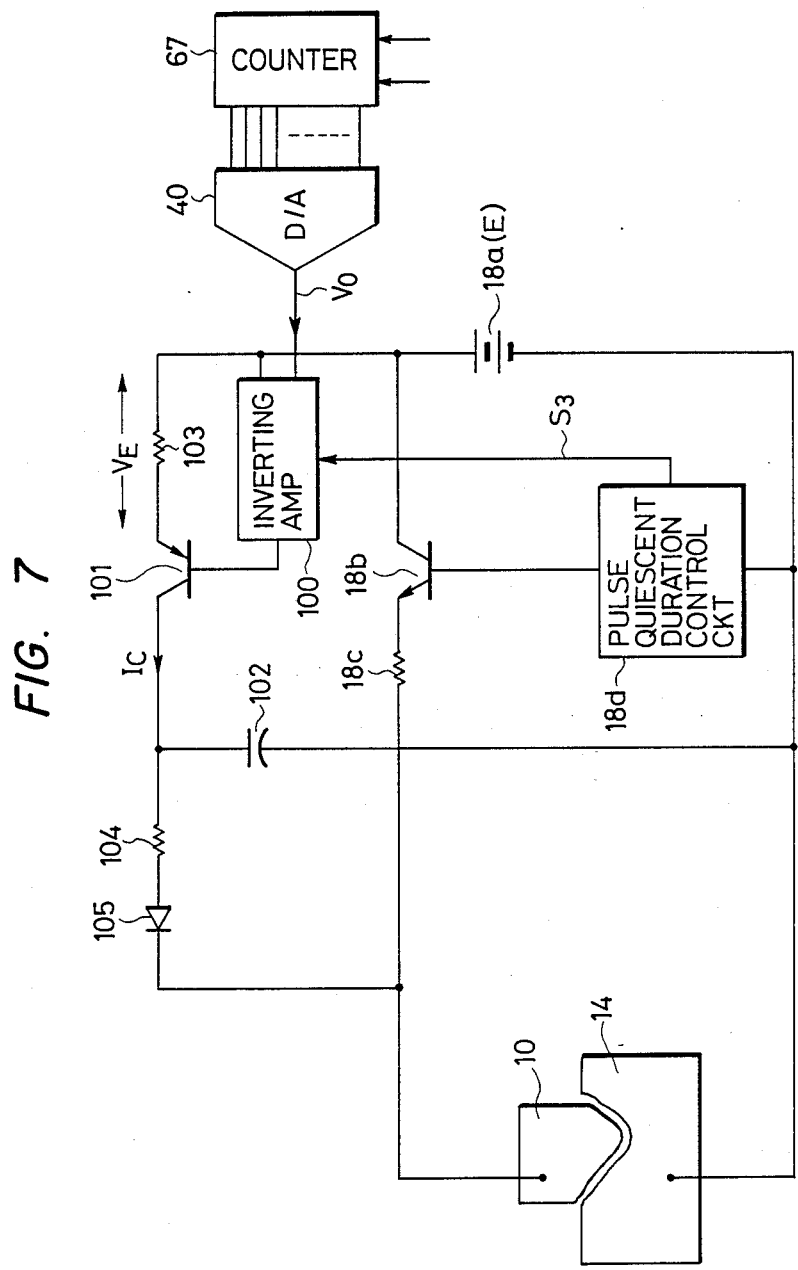
FIG. 7 is a block diagram of a control device for restoring an interelectrode gap based on a discrimination signal according to an embodiment of the present invention.

By varying the rate of change dv/dt of the voltage across the interelectrode gap based on the output generated by the foregoing detector circuit, the machining efficiency can be improved. More specifically, when the gap condition is poor, the voltage applied thereacross is increased gradually to reduce the ease with which a discharge occurs for thereby preventing a discharge concentration, and when the gap condition is good, the voltage is quickly raised to make it easier for a discharge to take place across the gap. A circuit arrangement for implementing the above operation is illustrated in FIG. 7. FIG. 8 is a timing chart illustrative of operation of the circuit shown in FIG. 7. An inverting amplifier 100 serves to invert the analog voltage $V_0$ dependent on the digital output from the counter 67 and apply the inverted voltage to the base of a PNP transistor 101. The voltage $V_g$ applied across the interelectrode gap is a value given by:

$$V_g = I_c t/C, \tag{1}$$

where $I_c$ is the collector current of the transistor 101, t is the time elapsed after the pulse voltage has been applied, and C is the capacitance of a capacitor 102. The collector current $I_c$ is substantially equal to, or about 99% of, a current flowing through an emitter-follower load resistor 103 for the transistor 101. If the resistor 103 has a resistance value $R_E$, the collector current $I_c$ is expressed by:

$$I_c = V_E/R_E = V_B/R_E, \tag{2}$$

where $V_E$ is the emitter voltage of the transistor 101 and $V_B$ is the base voltage thereof. From the equations (1) and (2), the voltage applied across the interelectrode gap is given as follows:

$$V_g = (V_B t)/(R_E C). \tag{3}$$

Assuming that $R_E = 5$ ohms, C=0.01 microfarads, and $V_B = 0$ to 10 V, the voltage gradient dv/dt varies in the range of from 0 to 200 V/microsecond. The inverting amplifier 100 is designed such that it produces an output voltage 10 V when the input voltage thereto is 0 V and produces an output voltage 0 V when the input voltage is 10 V, so that the greater the analog voltage $V_0$ or the poorer the condition of the interelectrode gap, the smaller the voltage gradient dv/dt. A resistor 104 serves to prevent charge stored in the capacitor 102 from adversely affecting machining operations when the capacitor 102 is discharged. A diode 105 prevents current from a switching transistor 18b from flowing back into the capacitor 102.

The transistor 18b remains turned on for a prescribed interval of time after a discharge has taken place across the interelectrode gap. The inverting amplifier 100 has an internal gate controlled also by a control signal S3 from a pulse quiescent duration control circuit 18d to prevent a voltage from being applied across the interelectrode gap during quiescent times. The timing chart of FIG. 8 shows operations of the circuit arrangement of FIG. 7, and illustrates, by way of logic levels of 0 and 1, the relationship between the detected voltage $V_0$ and the capacitor charging current $I_c$, and the conditions of energization and de-energization of the transistors.

With the above embodiment, in the event of a discharge concentration or a stepped leader of an arc, the count in the counter 67 in the detector circuit is incremented, and the output from the inverting amplifier is reduced to reduce the gradient of the applied voltage. Therefore, a discharge is less likely to be initiated, and no discharge concentration occurs, resulting in the restoration of the desired conditions of the interelectrode gap.

While in the above embodiment the gradient of the applied voltage is continuously controlled dependent on the count in the counter 67 in the detector circuit, the voltage gradient need not necessarily be controlled continuously, but may be varied in a pattern similar to a polygonal line, in a few steps, or in a stepwise manner.

As described above, according to the embodiment of FIGS. 7 and 8, any abnormal condition of the interelectrode gap is determined by the process mentioned earlier, and for restoring the condition of the interelectrode gap based on the result of the determination, the gradient of the voltage applied across the interelectrode gap is varied to control the ease with which a discharge can occur, thus preventing a discharge from concentrating in one point or preventing a high voltage from being continuously applied while the gap is not being deionized.

Figure 9:
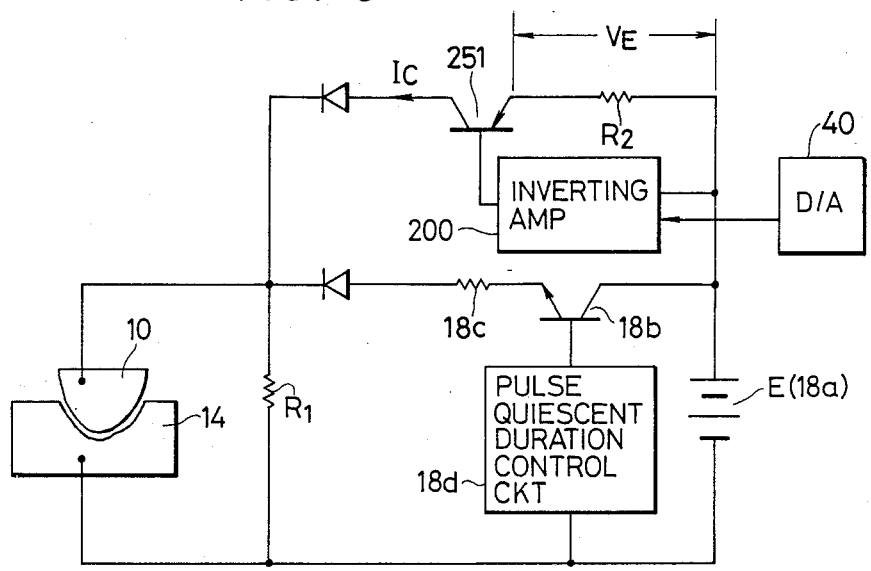
FIG. 9 is a block diagram of a control device for restoring an interelectrode gap based on a discrimination signal according to another embodiment of the present invention.

FIG. 9 illustrates another embodiment in which the voltage applied across the interelectrode gap is varied on the basis of the output signal from the digital-to-analog converter. By lowering the voltage at which a discharge can start, the discharge is less liable to start, and any discharge concentration in the interelectrode gap can be prevented. When there is no discharge concentration, the voltage applied across the interelectrode gap is raised to increase the ease with which a discharge takes place across the interelectrode gap. An inverting amplifier 200 shown in FIG. 9 serves to invert the analog voltage $V_0$ dependent on the output from the counter and apply the inverted voltage to the base of a PNP transistor 251. The voltage $V_g$ applied across the interelectrode gap has a value expressed by:

$$V_g = -I_c R_1. \tag{4}$$

The current $I_c$ is substantially equal to, or about 99% of, a current flowing through an emitter-follower load resistor $R_2$ for the transistor 251. The collector current $I_c$ is expressed by:

$$I_c = V_E/R_2 = V_B/R_2, \tag{5}$$

From the equations (4) and (5), the voltage $V_g$ is given as follows:

$$V_g = -(R_1/R_2)V_B. \tag{6}$$

Assuming that $R_1 = 30$ kiloohms, $R_2 = 1$ kiloohm, and E=300 V, the voltage $V_B$ varies in the range of from 0 to 300 V due to a variation from 0 to 10 V.

When a discharge concentration occurs and the counter 67 is incremented, the output from the inverting amplifier 200 is reduced and the interelectrode voltage $V_g$ is also lowered for thereby eliminating the discharge concentration.

While in the above embodiment of FIG. 9 the voltage applied across the interelectrode gap is varied dependent on the count in the counter 67 which detects a discharge concentration, the count in the counter and the applied voltage need not necessarily be in proportion to each other, but the applied voltage may more advantageously be varied at a ratio similar to the pattern of a series for the prevention of transition to an arc discharge.

According to the embodiment of FIG. 9, as described above, a discharge concentration and a poor condition of the interelectrode gap are discriminated by a distribution of times after a voltage has been applied and before a discharge takes place, and the voltage applied across the gap is controlled for discharge dispersion.

Figure 10:
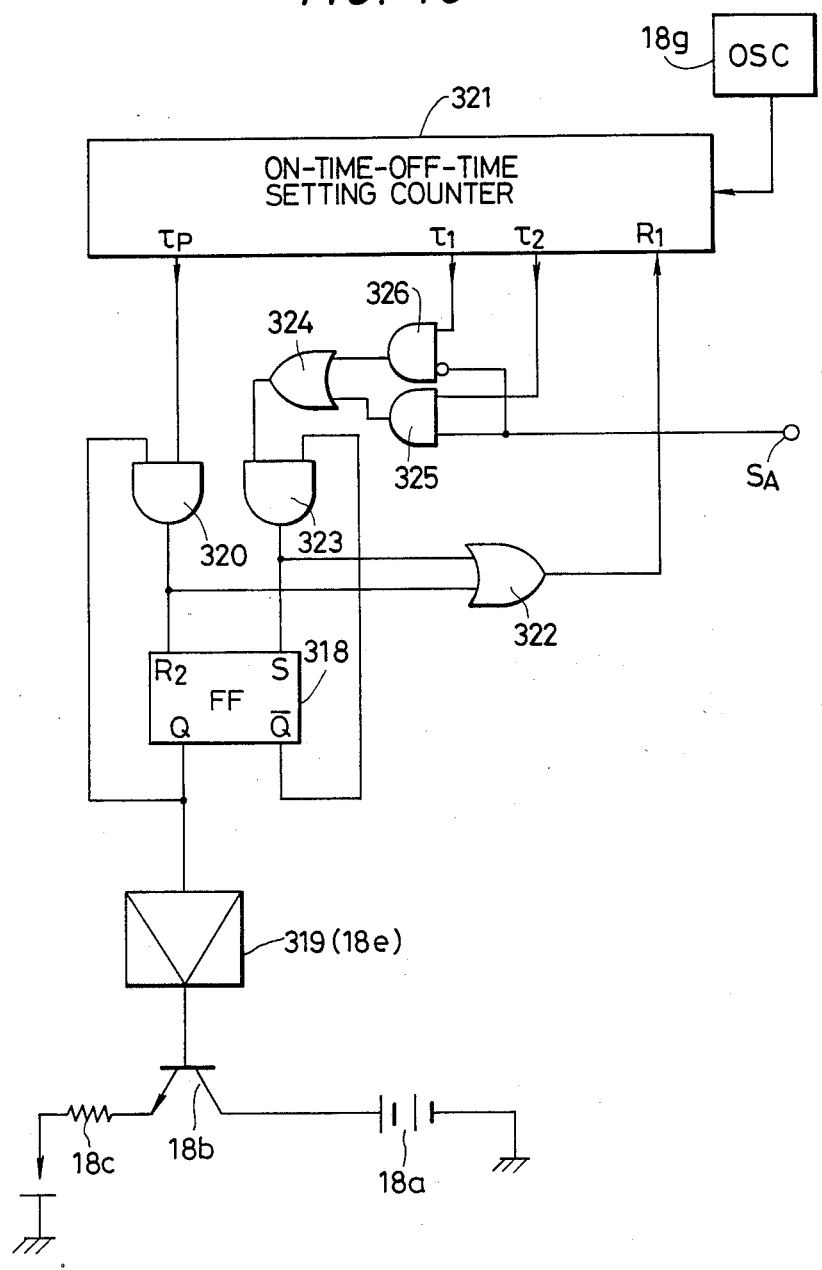
FIGS. 10 through 15 are block diagrams of a control device for restoring an interelectrode gap based on a discrimination signal according to other embodiments of the present invention.

The time period in which the switching element 18$b$ is turned off can be increased on the basis of the output from the detector circuit referred to above for extending the time interval between discharges to achieve a deionization effect. This can eliminate a cause of a discharge concentration. An embodiment for carrying out such an operation will be described with reference to FIG. 10. When an output Q of an RS flip-flop 318 is "1", the switching element 18$b$ is energized by an amplifier 319 during an ON time. When Q=0, the switching element 18$b$ is turned off during an OFF time. When Q=1, an AND gate 320 produces an output of "0" until an ON-time setting output $\tau_p$ from an ON-time/OFF-time setting counter 321 becomes "1". When the output $\tau_p$ is "1", the flip-flop 318 is reset, and the output Q becomes "0", entering the OFF time. At the same time, the output from the AND gate 320 resets an oscillator OSC and the time setting counter 321 through an OR gate 322. The counting is then started over. When Q=0 and no output "1" is issued until the output of an AND gate 323, that is, the output of an OR gate 324 becomes "1". The OR gate 324 and AND gates 325, 326 control the setting of two OFF times. When the signal SA is "0", $\tau_1$ is set and when the signal SA is "1", $\tau_2$ is set. With this embodiment, therefore, the workpiece is machined with the OFF time $\tau_1$ during a normal discharge, and with the OFF time $\tau_2$ during an abnormal discharge. When any discharge is judged as an abnormal discharge, the quiescent time is abruptly extended to provide a deionization effect for thereby preventing an unwanted discharge concentration and the generation of an abnormal arc. For such abnormality detection, the condition of the interelectrode gap is determined from the distribution of times after the voltage has been applied and before a discharge takes place.

Although in the above embodiment there are two OFF times $\tau_1$ and $\tau_2$, the OFF time may be continuously established dependent on the count in the counter 59 (FIG. 4) which counts the number of occurrences of discharge concentration.

Figure 11:
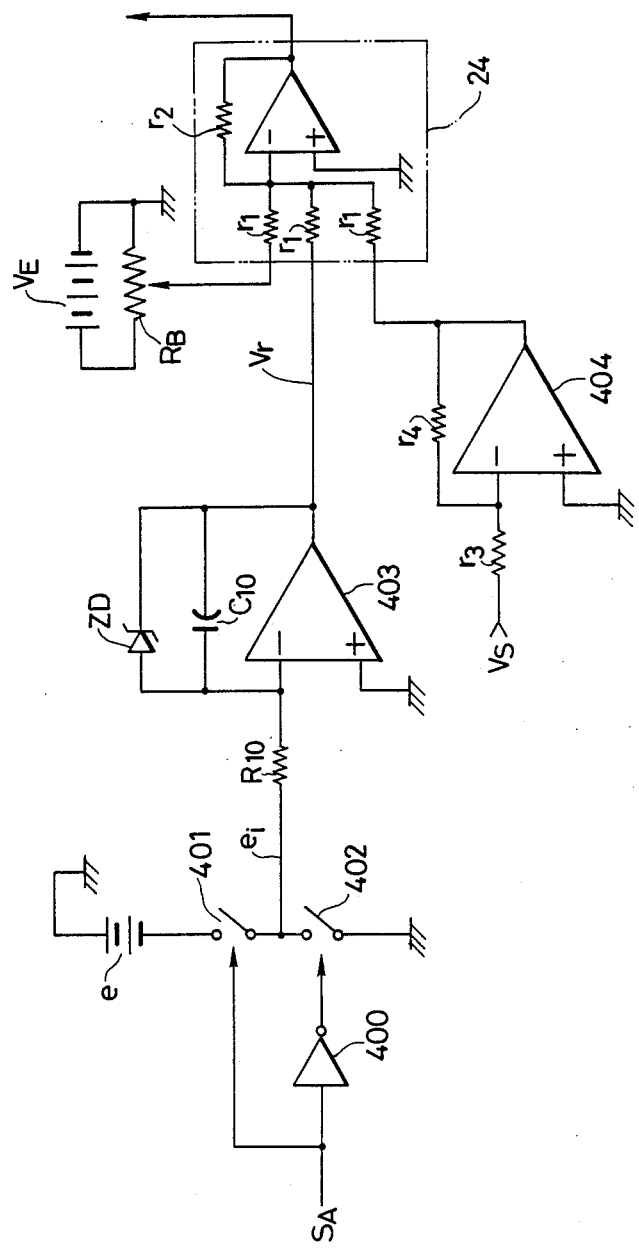

By controlling the interelectrode gap or varying the reference value $V_r$ of the interelectrode servo control signal based on the output from the previous detector circuit, the reference voltage can be increased when an abnormal discharge is detected to thereby increase the average interelectrode voltage, with the result that the interelectrode gap is widened and any discharge is less likely to occur, thus preventing a concentrated discharge. FIG. 11 illustrates a circuit arrangement for carrying out such a mode of operation.

When the detected signal SA is "1" or an abnormal discharge takes place, the output from an inverter 400 is "0", an analog switch 401 is turned on and an analog switch 402 is turned off. Therefore, an input voltage $e_i$ to an integrator circuit composed of an operational amplifier 403, a resistor $R_{10}$, and a capacitor $C_{10}$ is equal to $-e$, and the reference voltage $V_r$ is expressed as follows:

$$V_r = V + (e/R_{10} \cdot C_{10})t, \qquad (7)$$

where V is the initial value when t=0.

Therefore, as long as the signal SA is "1", the reference voltage $V_r$ continuously increases and the voltage $V_s$ is also negatively increased, resulting in the widening of the interelectrode gap. When the signal SA is "0", that is, there is no discharge concentration or no abnormal condition in the interelectrode gap, the input voltage $e_i$ is 0, and the voltage stored in the integrator capacitor $C_{10}$ is discharged. As a result, the reference voltage $V_r$ is lowered to control the interelectrode gap to be narrowed. Then, the frequency of discharge is increased and the speed of machining the workpiece is also increased. The resistor $R_{10}$ and the capacitor $C_{10}$ which determine the time constant of the integrator circuit have values such that the time constant is on the order of a few decades of seconds. If the reference voltage $V_r$ were varied in too a short period of time, the length of the interelectrode gap would vary abruptly, resulting in undesirable hunting and electrode vibration. The control range is limited in that the reference voltage $V_r$ is controlled by a zener diode ZD to range between a zener voltage in a positive direction and zero in a negative direction. A power supply $V_E$ and a variable resistor $R_B$ serve to allow manual setting. The interelectrode gap control is effected automatically around the manual setting value. An operational amplifier 404 and resistors $r_3$ and $r_4$ serve as an inverter and an attenuator for adding the average voltage $V_s$ across the interelectrode gap and the reference voltage $V_r$.

While in the foregoing embodiment the reference voltage $V_r$ is varied by integrating the detected signal SA, the count in the counter 67 may be converted from a digital value into an analog value which may be passed through a circuit having a time lag of first order with a large time constant for finer control.

With the embodiment of FIG. 11, as mentioned above, abnormal and normal discharges are discriminated from each other by detecting a distribution of times after a voltage has been applied and a discharge is generated, and, when an abnormal discharge occurs, the interelectrode gap is widened to lower the frequency of discharge for normalizing the discharging condition by varying the reference value for the servo control of the interelectrode gap, thereby restoring the desired interelectrode condition.

The amount of the machining solution injected into the interelectrode gap can be varied dependent on the count in the counter 67 for restoring the interelectrode condition. Such an arrangement will be described with reference to FIG. 12. An output passage from a machining solution supply pump 516 is connected through variable-flow valves $V_1$, $V_2$, $V_3$ and $V_4$ and a pipe 517 to an injection path 518 defined in the electrode 10. The amount of the machining solution supplied is varied by opening and closing the valves $V_1$, $V_2$, $V_3$ and $V_4$ which are controlled by output signals $2^6$–$2^9$ from the reversible counter 47. In the illustrated embodiment, the valves $V_1$, $V_2$, $V_3$ and $V_4$ are designed to pass the fluid at flow rates of 100 cc/min., 200 cc/min., 400 cc/min., 800 cc/min., respectively, so that an amount of the machining solution matching the condition of the interelectrode gap can be supplied into the gap. For example, when the count in the counter 67 is "64" or more, the output $2^6$ is "1", and hence the valve $V_1$ is opened to allow the solution to flow at the rate of 100 cc/min. When the count in the counter 67 is "192", the outputs $2^6$ and $2^7$ are "1", and the valves $V_1$ and $V_2$ are opened to supply the machining solution at the rate of 300 cc/min. When the count is quite large, for example, 1024 or above, a forced-injection valve $V_5$ is opened through an OR gate 519 to supply the solution at the rate of a few thousands cc/min. Conversely, when the count is small, a small amount of solution which is used for normal machining is fed through a manually controlled valve $V_0$ into the interelectrode gap.

Figure 12:
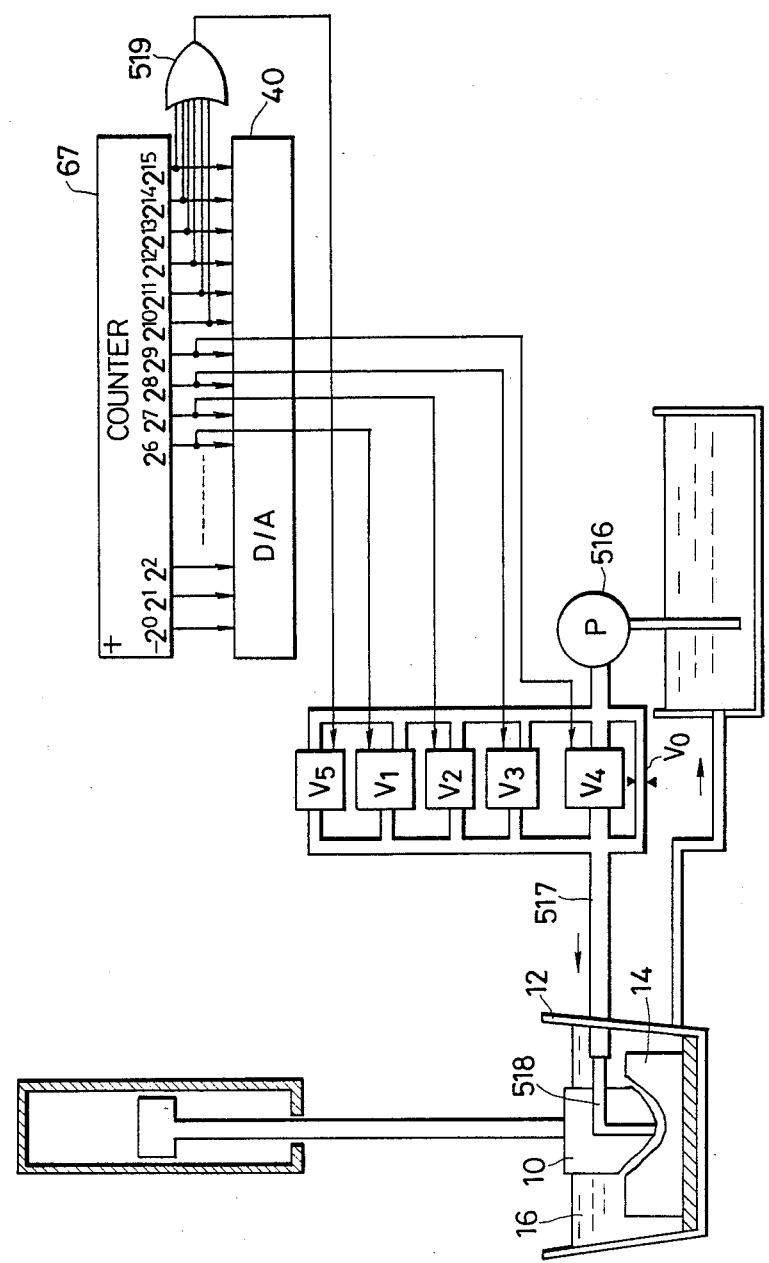

With the embodiment of FIG. 12, as discussed above, the amount of flow of the machining solution is controlled dependent on the interelectrode conditions to efficiently discharge sludge produced in the interelectrode gap for thereby increasing the discharging efficiency. More specifically, when there is a deposit of sludge in the interelectrode gap, a discharge arc is produced in the path from the electrode to the sludge to the workpiece, and a considerable amount of energy is consumed in the mass of sludge, resulting in a reduced degree of machining efficiency. The arrangement of FIG. 12 can prevent such a reduced machining efficiency. Since the flow rate of the solution is reduced when the interelectrode gap is narrow, the interelectrode impedance does not become higher than required, and a discharge tends to be generated with greater ease, so that machining will be rendered stable and the machining speed will be increased.

Figure 13:
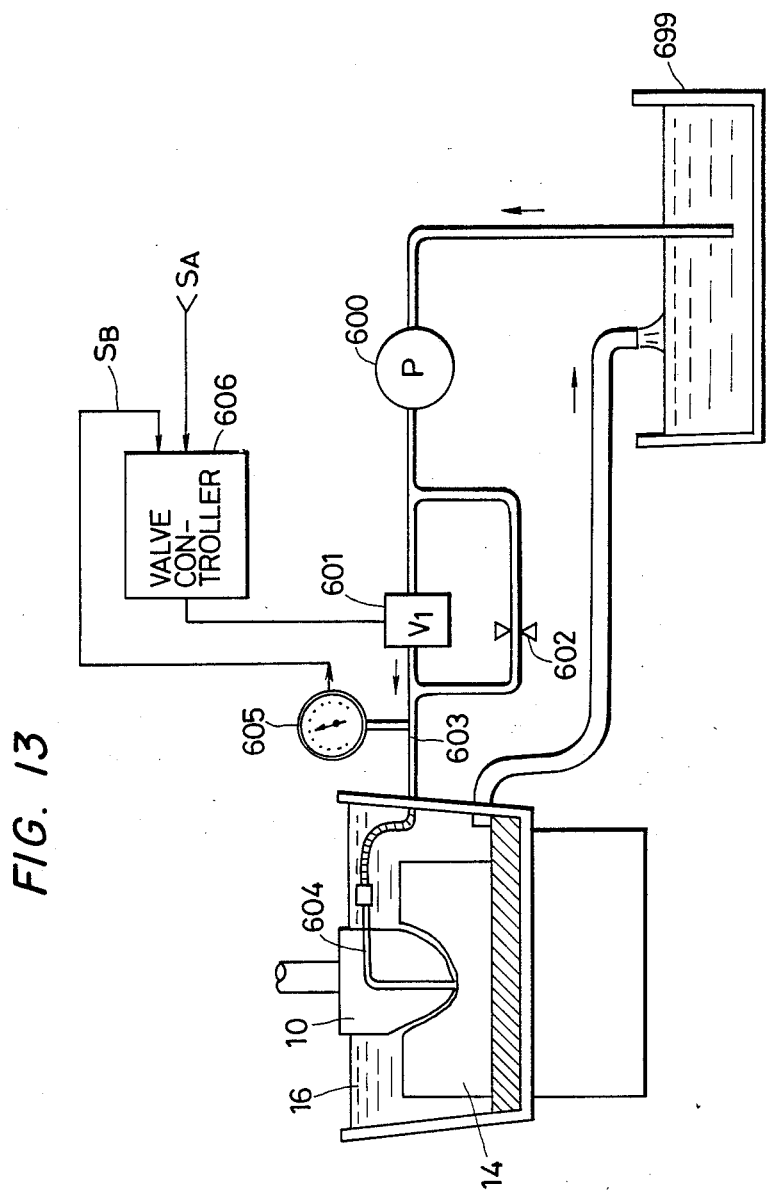

The interelectrode condition can be restored by varying the pressure under which the machining solution is injected into the interelectrode gap dependent on the presence or absence of the detected signal SA. As shown in FIG. 13, a machining solution pumped by a supply pump 600 from a solution tank 699 is fed through a pipe 603 via a solenoid-operated valve 601 and a manually operated valve 602, the pipe 603 being connected to an injection path 604 defined in the electrode 10. The pressure of the machining solution is measured by a pressure meter relay 605 which issues a feedback signal SB to a controller 606 of the solenoid-operated valve 601 when the solution pressure exceeds a prescribed pressure, thereby maintaining the solution pressure at an appropriate level. The manually operated valve 602 serves to keep a minimum pressure in the event that the solenoid-operated valve 601 fails to operate. When the machining condition becomes poor and machined chips are deposited in the interelectrode gap, the detected signal SA is issued to the valve controller 606 to open the solenoid-operated valve 601 continuously until a signal is fed back from the pressure meter relay 605. The deposited machined chips are then expelled out of the gap under the high injection pressure to restore the interelectrode condition. When the interelectrode condition has been restored, the detected signal SA is no longer generated, and the solenoid-operated valve 601 is closed and the solution pressure returns back to the pressure established solely by the manually operated valve 602. The reason for the two solution pressures is as follows: In general, the interelectrode impedance is most appropriate (a discharge can easily take place and machining stability is good when the interelectrode gap is smeared to a certain degree), and the electrode 10 is consumed to a small extent when the solution pressure is 0.05 kg/cm$^2$. If the pressure were 0.5 kg/cm$^2$ or higher, the surface temperature of the electrode 10 would be lowered, and no protective film of pyrographite would be expected to be formed on the surface of the electrode 10. The electrode 10 would then be consumed to a larger extent, or the impedance of the interelectrode gap would become too high and the gap length for discharges would be too small, resulting in a greater tendency of short-circuiting and unstable machining. In normal conditions, the workpiece should preferably be machined under the solution pressure of 0.05 kg/cm$^2$ or lower. The higher-pressure solution flow is required only when the interelectrode gap is too smeared or sludge due to machining is deposited in the gap. Experiments have indicated that the low and high solution pressures of 0.05 kg/cm$^2$ and 1 kg/cm$^2$ are effective for the combination of a copper electrode and an iron workpiece, and the low and high solution pressures of 0.2 kg/cm$^2$ and 4 kg/cm$^2$ are effective for the combination of a copper-tungsten electrode and a tungsten-carbide workpiece. According to the arrangement of FIG. 13, the pressure at which the machining solution is ejected is controlled dependent on the condition of the interelectrode gap to effectively discharge machined chips produced in the gap for increasing the machining efficiency. Since a discharge spark is produced in the path from the electrode to the machined chips to the workpiece in the event that the machined chips are present in the interelectrode gap, a considerable proportion of discharging energy would be consumed for thermal decomposition of the machined chips and the machining solution, resulting in a reduced machining speed. However, the arrangement shown in FIG. 13 can prevent such an unwanted phenomenon, or an arc discharge due to the machined chips or carbon produced by thermal decomposition of the solution. Briefly summarized, any abnormal discharge is determined by the process as described previously and the interelectrode gap condition is restored on the basis of the detected result, and the interelectrode gap is restored to a good condition by removing the machined chips and carbon out of the gap under a varied solution pressure.

Although the solution is injected into the interelectrode gap, it may be drawn under suction while the workpiece is being machined.

By varying the gain or sensitivity of the means for controlling the interelectrode gap based on the output produced by the detector circuit, the gap can be restored from short-circuiting, opened conditions, or stepped leader of an arc. When the interelectrode gap is in a poor condition, the gain of the servo system is increased to increase the speed at which the gap is narrowed and widened, for thereby releasing the gap from the mechanically adverse condition or restoring the gap.

An embodiment for effecting such a mode will be described with reference to FIG. 14. A multiplication-type digital-to-analog converter 700 is responsive to an output from the counter 67 for issuing a multiplied value of an input analog signal $V_r-V_s$, and may be a type AD 7520 manufactured by Analog Devices Corp. The digital-to-analog converter 700 may be considered as having the function of varying the input signal as a function of the digital output value from the detector circuit. With this embodiment, the servo system gain is increased by the multiplication-type digital-to-analog converter 700 as the interelectrode gap condition becomes worse, and the output from the converter 700 is supplied to the servo valve 26 through an amplifier 24 composed of resistors 702 and 703 and an operational amplifier 704 for increasing the speed of operation of the servo actuator. Although in the present embodiment the servo system gain is increased in substantially linear proportion to the adverse condition of the interelectrode gap, it may not necessarily be linearly proportional to the gap condition, but may be varied in the pattern of a quadratic function or a polygonal line. The embodiment can be reduced to practice with ease and at a reduced cost by employing the detected signal SA and two step control.

Experiments have shown that when the interelectrode condition becomes poor, the discharge is turned into an arc discharge unless the speed of at least 20 mm/min. is ensured, and when a large quantity of machined chips is deposited in the gap, a speed on the order of 200 mm/min. is required. It has also been confirmed that for stable machining, the machining efficiency is high at a speed ranging from 5 to 10 mm/min. for finishing machining for a surface roughness of 15 $R_{max}$ or lower. It is considered that the speed setting is required in these ranges.

Figure 14:
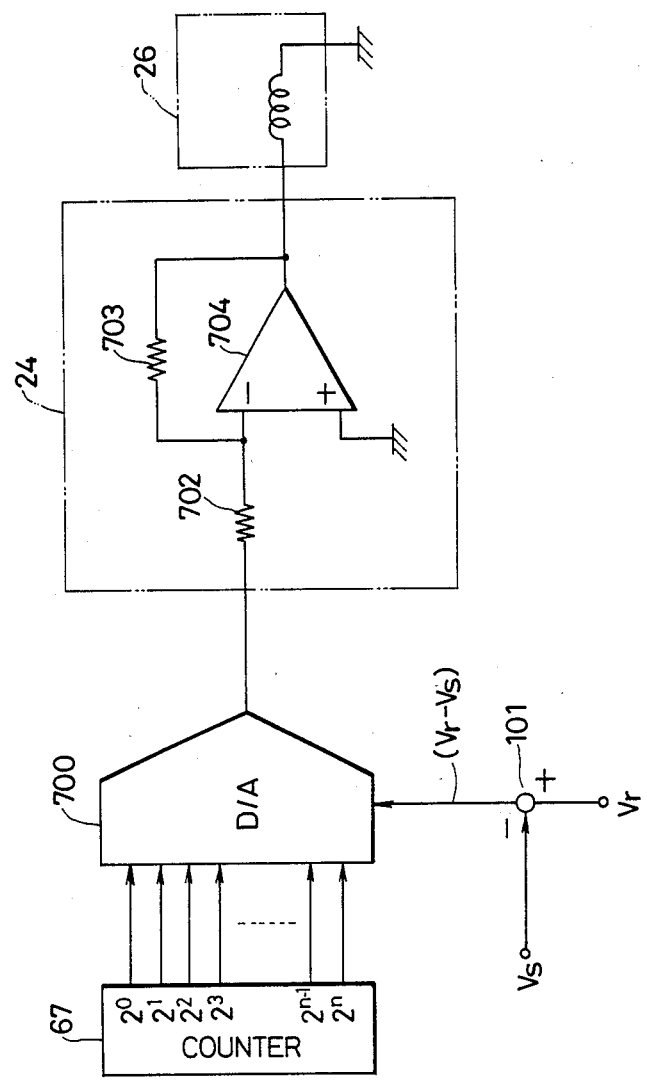

With the embodiment of FIG. 14, as described above, any abnormal interelectrode condition is determined by the previously described detecting process, and to restore the interelectrode gap condition based on the result of such determination, the sensitivity of the servo for varying the interelectrode gap is varied to control the speed of operation of the servo actuator, so that the interelectrode gap can be narrowed or widened quickly.

Figure 15:
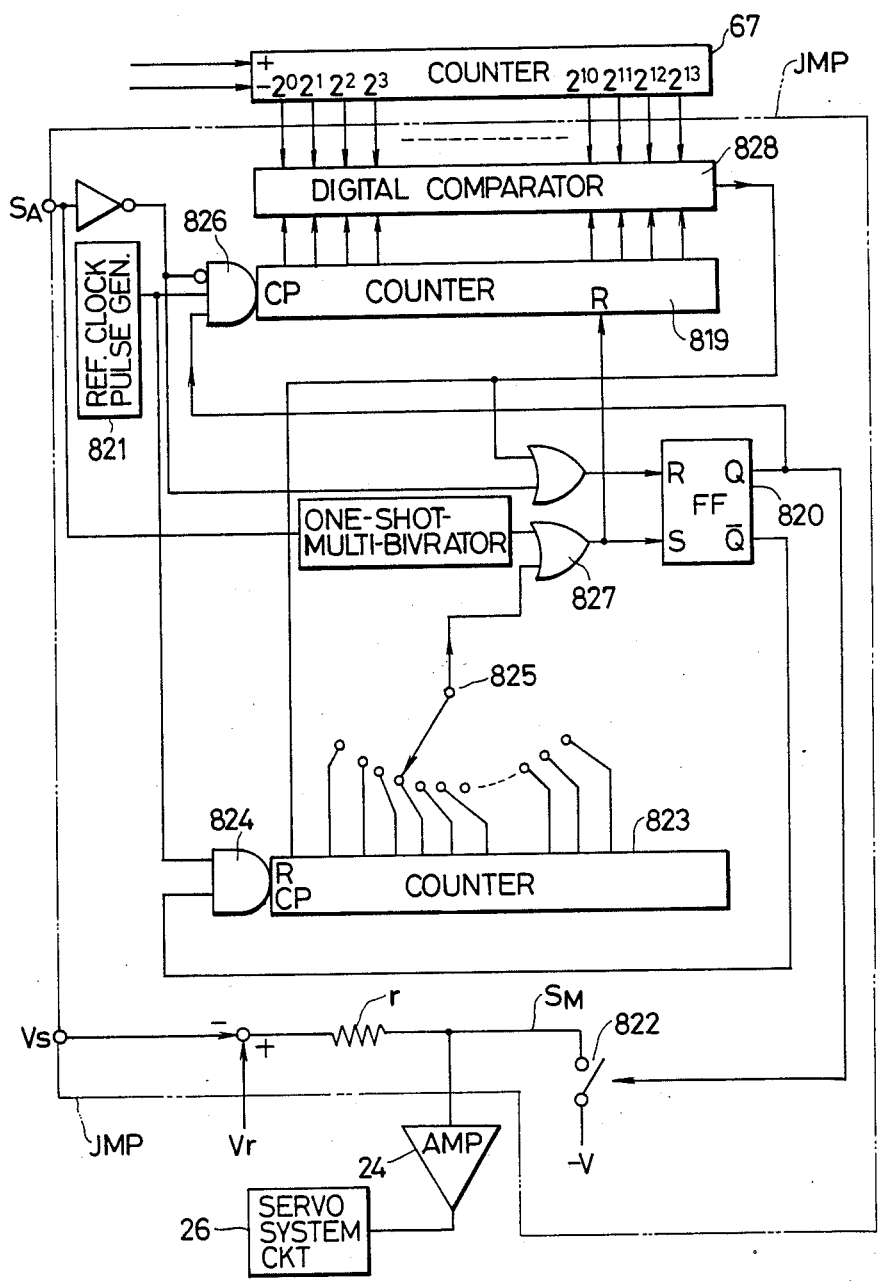

FIG. 15 illustrates another embodiment of the present invention, in which the output from the interelectrode abnormality detector, as described above, and the binary values of the outputs $2^0$-$2^n$ from the counter 67 are fed to an interelectrode gap control device JMP which controls the interelectrode gap for forcibly widening the interelectrode gap with these signals to effect automatic control of the extent to which the gap is widened.

FIG. 15 shows the interelectrode gap control device JMP. In the illustrated embodiment, the above signals supplied control the time in which a signal for forcibly widening the gap continues, thereby controlling the extent to which the gap is widened, and the ratio of a machining time to a time required for widening the gap.

In FIG. 15, a multiple-bit-position coincidence circuit or a digital comparator 828 determines when the count in the counter 67 is equal to the count in a gap widening time setting counter 819. When the counts coincide, the digital comparator 828 resets an RS flip-flop 820. A time set by the counter 819 is equal to the product of the period of clock pulses generated by a reference clock pulse generator 821 and the count in the counter 67 with which the count in the counter 819 coincides. The RS flip-flop 821 produces an output Q for actuating an analog switch 822 to forcibly cause the servo system circuits 24 and 26 to produce an electrode raising signal SM. During a time corresponding to a positional difference, the output Q of the RS flip-flop 820 is "1", during which time the electrode is forcibly raised. The RS flip-flop 820 is temporarily reset by the output from the digital comparator 828, whereupon the output Q is "0" and an inverted output is "1". A clock pulse input gate 824 for a machining time setting counter 823 is then opened to cause the output Q of the RS flip-flop 820 to be "0" during the time in which a machining time presetting switch 825 is set. Therefore, the analog switch 822 for generating the electrode raising signal SM is opened to effect normal servoed control of the interelectrode gap based on the difference between the interelectrode signal $V_s$ and the reference voltage Vr. The switching operation of the analog switch 822 is continued during the time when the signal SA is "1". A resistor r serves to protect the circuit for generating the voltages $V_s$ and $V_r$ when the electrode raising signal $V_M$ is produced.

The foregoing operation is not always effected, but is carried out when the interelectrode abnormality signal SA is "0", that is, when the interelectrode gap is in an abnormal condition. The signal SA is discriminated by an AND gate 826 and an OR gate 827. When the signal SA is "1", the OR gate 827 produces an output signal of "1", and the RS flip-flop 820 remains set. No electrode raising signal SM is then issued, and normal servo control is effected of the interelectrode gap.

According to the embodiment shown in FIG. 15, when the interelectrode abnormality signal SA becomes "0", the interelectrode gap is automatically set dependent on the discharging condition and the interelectrode gap condition at that time. The larger the difference, the greater the time for widening the gap and the extent to which the gap is widened, thus improving the gap condition. When the signal SA is "1", the electrode is not forcibly lifted, but normal servo interelectrode gap control is carried out.

While in the above embodiment the electrode raising time is controlled, in the present embodiment the control of the gap between the electrode and the workpiece to improve the interelectrode gap condition is carried out based on the abnormality condition signal. It is not technically difficult to do this and can appropriately be effected to control the machining time, the speed of lifting movement of the electrode, the period of the lifting movement and machining operation, the reference voltage for servo control, and other parameters as well as the electrode raising time, with the abnormality condition signal.

According to the arrangement of the above embodiment, any abnormal condition of the interelectrode gap is determined by the detecting process previously described, and the interelectrode gap condition can be restored on the basis of the result of determination.

Although certain preferred embodiments have been shown and described, it should be understood that many changes and modifications may be made therein without departing from the scope of the appended claims.

I claim:

1. A discharge machining apparatus comprising: an electrode disposed in confronting relation to a workpiece with an insulative machining solution interposed therebetween for machining the workpiece by an electric discharge generated across an interelectrode gap between said electrode and said workpiece; detector means for detecting a distribution of times prior to generation of said discharge across said interelectrode gap after a voltage has been applied thereacross, wherein said voltage comprises a pulsed voltage having a predetermined time duration and applied periodically across said interelectrode gap, said detector means being arranged to divide said time duration of said voltage into a plurality of intervals and count occurrences of discharge started in each of said intervals for a predetermined period of time, such that said distribution of times is detected; and interelectrode condition discriminator means for comparing a distribution of times as detected by said detector means after the voltage has been applied across said interelectrode gap and before the discharge is generated thereacross to produce a signal indicative of a condition of said interelectrode gap.

2. A discharge machining apparatus according to claim 1, wherein said detector means comprises means for calculating a first percentage of discharges occurring within a first time interval, means for calculating a second percentage of discharges occurring within a second time interval, and means for calculating a third percentage of discharges occurring within a third time interval, said interelectrode condition discriminator means outputting a signal indicative of a condition of said interelectrode gap accordingly.

3. A discharge machining apparatus according to claim 1, wherein said detector means comprises means for counting occurrences of discharge started within 5 microseconds after said voltage has been applied, occurrences of discharge started within 5 to 30 microseconds after said voltage has been applied, and occurrences of no discharge started upon elapse of said predetermined time duration for thereby detecting said distribution of times.

4. A discharge machining apparatus according to claim 3, wherein said interelectrode condition discriminator means comprises means for determining that the condition of said interelectrode gap is abnormal, said interelectrode gap being abnormal when the percentage of discharges started within 5 microseconds after said voltage has been applied is 50% or more or the percentage of no discharges started upon elapse of said predetermined time duration is 50% or more, and determining that the condition of said interelectrode gap is normal when the percentage of discharges started within 5 to 30 microseconds after said voltage has been applied to 10% or more.

5. A discharge machining apparatus according to claim 1, wherein said interelectrode condition discriminator means comprises means for issuing a signal indicative of an abnormal condition of said interelectrode gap when said interelectrode condition discriminator means determines that the condition of the interelectrode gap is abnormal continuously for a predetermined interval of time.

6. A discharge machining apparatus according to claim 4, wherein said interelectrode condition discriminator means comprises means for issuing a signal indicative of an abnormal condition of said interelectrode gap for a shorter period of time as the time in which said interelectrode condition discriminator means continuously determines that the condition of the interelectrode gap is abnormal becomes progressively shorter.

7. A discharge machining apparatus according to claim 1, wherein said detector means comprises means for detecting when said discharge is started by detecting a falling edge of the voltage applied across said interelectrode gap.

8. A discharge machining apparatus according to claim 1, wherein said interelectrode condition discriminator means comprises memory means for determining whether the occurrences of discharge in each interval is in a normal range or an abnormal range and for storing the result when the occurrences of discharge are determined as falling in the abnormal range, said memory means accumulating and storing results of determination of the abnormal range each time the occurrences are determined as falling in the abnormal range.

9. A discharge machining apparatus according to claim 8, wherein said memory means comprises means for erasing the stored results of determination of the abnormal range when the occurrences are determined as falling in the normal range.

10. A discharge machining apparatus according to claim 1, wherein said predetermined time for said detector means to detect the distribution of times to generate the discharge ranges from 10 to 30 milliseconds.

11. A discharge machining apparatus according to claim 1, further comprising control means for controlling the rate of increase of said voltage per unit time based on an output signal from said interelectrode condition discriminator means.

12. A discharge machining apparatus according to claim 1, further comprising control means for controlling the value of said pulsed voltage based on an output signal from said interelectrode condition discriminator means.

13. A discharge machining apparatus according to claim 12, wherein said control means comprises means for lowering said voltage when the condition of said interelectrode gap is abnormal.

14. A discharge machining apparatus according to claim 1, further comprising control means for varying a quiescent time of said pulsed voltage based on an output signal from said interelectrode condition discriminator means.

15. A discharge machining apparatus according to claim 14, wherein said control means comprises means for extending said quiescent time when the condition of said interelectrode gap is abnormal.

16. A discharge machining apparatus according to claim 1, further comprising control means for controlling a reference voltage based on an output signal from said interelectrode condition discriminator means.

17. A discharge machining apparatus according to claim 1, further comprising control means for controlling the rate of flow of said machining solution supplied into said interelectrode gap based on an output signal from said interelectrode condition discriminator means.

18. A discharge machining apparatus according to claim 1, further comprising control means for controlling the pressure under which said machining solution is supplied into said interelectrode gap based on an output signal from said interelectrode condition discriminator means.

19. A discharge machining apparatus according to claim 1, further comprising servo means for controlling said interelectrode gap, and control means for controlling the sensitivity of said servo means based on an output signal from said interelectrode condition discriminator means.

20. A discharge machining apparatus according to claim 1, further comprising control means for controlling said interelectrode gap based on an output signal from said interelectrode condition discriminator means.

* * * * *